Figure 1:
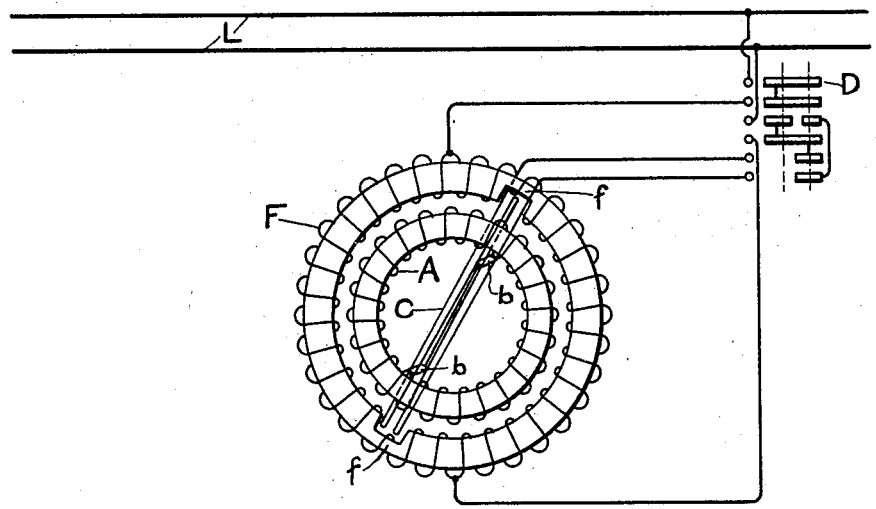

No. 822,311. PATENTED JUNE 5, 1906.
C. P. STEINMETZ.
ALTERNATING CURRENT MOTOR.
APPLICATION FILED SEPT. 26, 1904.

Witnesses:
Irving E. Steers.
Helen Alford

Inventor,
Charles P. Steinmetz.
by Albert G. Davis
Att'y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

ALTERNATING-CURRENT MOTOR.

No. 822,311.

Specification of Letters Patent.

Patented June 5, 1906.

Application filed September 26, 1904. Serial No. 225,905.

*To all whom it may concern:*

Be it known that I, CHARLES P. STEINMETZ, a citizen of the United States, residing at Schenectady, county of Schenectady, State of New York, have invented certain new and useful Improvements in Alternating-Current Motors, of which the following is a specification.

My invention relates to electric motors, and is particularly applicable to motors designed for operation on alternating current.

The object of my invention is to provide a motor having an altered speed torque characteristic, the better to adapt it for certain kinds of work—such, for instance, as railway-work or other applications requiring a large starting torque.

When a direct-current series motor is supplied from a constant-potential source and when the load on the motor is increased, so as to require greater torque, the speed falls sufficiently to reduce the counter electromotive force of the motor by the necessary amount to permit a flow of current for giving the required torque. As the load is still further increased the speed is still futher reduced, until at zero speed the flow of current is limited only by the ohmic resistances of the motor-circuit and the torque is enormous. With an alternating-current motor, on the other hand, the counter electromotive force due to rotation and the ohmic resistance are not the only impedances opposed to the flow of current. The counter electromotive force of self-induction of the motor-circuits is an important factor. The self-induction of the armature increases as the speed of the motor decreases and tends to counterbalance the decrease in counter electromotive force of rotation due to the decrease in speed. Therefore when the load increases by a certain amount the speed of the motor decreases a greater amount than it would decrease in a similar direct-current motor in order to obtain the requisite current-flow for supplying the required torque, since the current increases with decrease of speed at a slower rate than in a direct-current motor. For certain classes of work the alternating-current motor is therefore less suitable, since its speed with increase of load does not hold up as well as in a direct-current motor.

In any motor, whether alternating or direct current, having what may be termed "series" characteristics—such, for instance, as the series motor, whether direct or alternating, and the repulsion-motor for alternating current—the field strength increases with increase of current. The increase of field strength tends to balance the drop in counter electromotive force due to decrease of speed with increasing load. Evidently if this increase of field strength with increased current-flow could be reduced the speed torque characteristic of a motor would be altered, so that for a given decrease in speed a greater decrease in counter electromotive force would result with a greater increase in current-flow and a consequently greater increase in torque—that is, by reducing the increase in field strength with decreasing speed in an alternating-current motor the speed torque characteristic may be altered so as to conform more closely to that of a modern direct-current railway-motor. This result may be accomplished by so proportioning a portion of the magnetic circuit that saturation is reached with a certain predetermined current-flow, so that a decrease in speed to produce a current-flow in excess of the predetermined value will produce no corresponding increase of field strength, so that a small decrease of speed will produce a large increase of torque, as has been heretofore explained.

One feature of my invention consists in securing the desired saturation of a portion of the magnetic circuit of a motor of the type in which the field is approximately uniformly distributed around the armature by removing a portion of the iron of the field or stator adjacent to the armature-coils short-circuited by the rotor-brushes. By this means not only is the desired saturation obtained, but the magnetic field at the coils undergoing commutation is weakened and the commutation consequently improved.

The smaller increase of torque for a given decrease of speed in an alternating-current motor as compared with a direct-current motor of a similar type, which for low speeds is disadvantageous, as has been heretofore pointed out, in reducing the torque of the alternating-current-motor at low speeds as compared with the direct current, is also frequently disadvantageous at high speeds, since the smaller decrease of torque with increase of speed may result in a serious overloading of the motor at high speeds. In order to prevent this overloading, means may be provided for accomplishing the reverse of the object of the arrangement for altering the torque characteristics at low speed—that is, for increasing the field strength as the motor speed increases. The field strength of the motor could of course be increased by increasing the potential impressed on the motor; but this would also increase the flow of armature-current and would simply overload the motor more than before. By my invention I employ an auxiliary winding arranged to increase the field strength of the motor at high speeds without increasing the flow of armature-current. By connecting this winding in series with the main field-coils of the motor for high speeds a greater increase of counter electromotive force with a given increase of speed is obtained, with consequently a greater decrease in current and torque. In order to prevent the auxiliary coil from affecting the current in the armature, it is essential that it should be arranged non-inductively with reference to the armature-winding, and since a winding placed with its opposite sides adjacent to the armature-brushes is in a non-inductive position relative to the armature I am able to utilize the recesses formed by removing a portion of the stator-iron adjacent to the brushes, as has been heretofore described, for receiving the auxiliary coil.

My invention will best be understood by reference to the accompanying drawings, in which—

Figure 2:
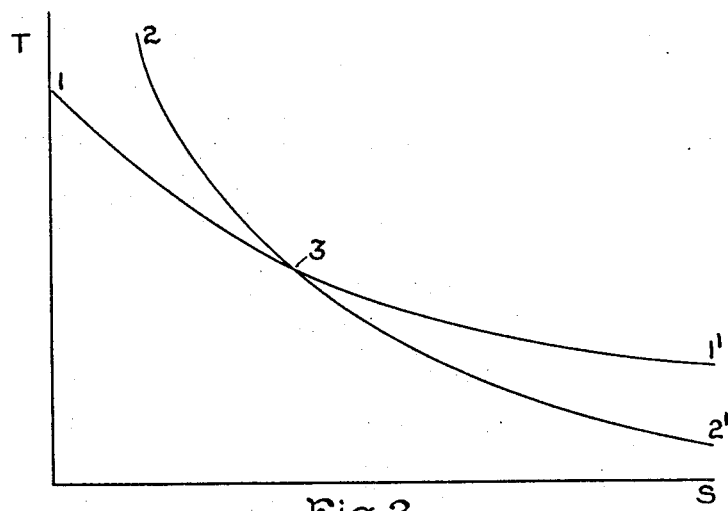

Figure 1 shows diagrammatically a motor arranged in accordance with my invention and provided with a controlling-switch for connecting the auxiliary coil in circuit, and Fig. 2 is an explanatory diagram showing the variation in speed torque characteristic produced by means of my invention.

In Fig. 1, F represents the field-winding, and A the armature-winding, of an alternating-current motor. The armature-winding is provided in the usual manner with the commutator-brushes $b$ $b$. It will be seen that I have chosen to illustrate my invention as applied to a repulsion-motor; but it will be understood that my invention is not limited in any way to this particular type. Furthermore, for the sake of simplicity I have shown both members provided with Gramme-ring windings; but it will be understood that any well-known form of winding may be employed, and in practice the usual distributed drum-winding would preferably be employed. It will be seen that the iron of the field-magnet is cut away at $ff$, so as to form two recesses adjacent to the commutator-brushes $b$ $b$. These recesses not only serve to give a weak field for the coil undergoing commutation, but also serve to produce a saturation of the field-magnet structure at these points when the current in the field-winding rises to a certain amount.

Referring now to Fig. 2, 1 1' represent approximately the speed torque curve of an ordinary repulsion-motor. Now if the magnetic circuit of the motor becomes saturated by the current which flows in the motor-winding when the speed falls to an amount indicated by the point 3 on the curve 1 1 upon further decrease in speed the fall in the counter electromotive force of rotation will no longer be partially balanced by an increase in field strength, so that a small decrease in speed will result in a comparatively large decrease in counter electromotive force, a comparatively large increase in current, and a comparatively large increase in torque, as has been heretofore explained. In other words, the speed torque curve will be steeper than it would have been without saturation—that is, the torques for the different speeds below point 3 will be indicated by the curve 3 2. Thus the torques for the low speeds are increased by the saturation of a portion of the magnetic circuit.

C represents an auxiliary coil or winding which is placed in the recesses in the field-magnet adjacent to the commutator-brushes $b$ $b$. It will be seen that this coil C is in non-inductive relation to the armature-winding A—that is, it can induce in it no current by transformer action; but it is most effectively disposed for producing a flux which generates an electromotive force in armature-winding A, due to the rotation of the armature-winding. For a given current strength in coil C this induced electromotive force will increase with increase of the motor speed, and if the coil C is properly connected the electromotive force induced thereby will assist the counter electromotive force induced by the main field-winding F, so as to produce a greater increase in counter electromotive force, and consequently a greater decrease in current-flow and in torque for a given increase of speed. In other words, the speed torque curve will be made steeper at high speeds by the introduction of the auxiliary coil C, as is indicated by the curve 3 2'. Consequently by means of the saturation of the field-coil at low speeds and the introduction of the auxiliary coil at high speeds the speed torque characteristic of the motor may be altered from the curve 1 1' to the curve 2 2'.

In Fig. 1 I have shown a controlling-switch D, adapted to cut the auxiliary coil C into and out of the circuit of the field-winding F. In the first position of switch D the field-winding F alone is connected to the line-wires L, as will be seen by tracing out the circuit. In the second position of the switch D the auxiliary coil C is included in series with the field-winding F, so as to increase the field strength of the motor in the manner that has been heretofore explained.

At low speeds by reversing the current in the coil C, so as to make it demagnetizing, the magnetic field can be reduced and the speed so increased, giving a similar effect as produced above by saturation.

I do not desire to limit myself to the particular construction and arrangement of parts here shown; but I aim in the appended claims to cover all modifications which are within the scope of my invention.

What I claim as new, and desire to secure by Letters Patent of the United States, is—

1. In an alternating-current motor, an armature-winding provided with a commutator and brushes, and a field approximately uniformly distributed around the armature and having a portion, adjacent to the armature-coils which are short-circuited by the brushes, reduced in cross-section so as to be saturated through a portion of the working range of the motor.

2. In an alternating-current motor, an armature-winding provided with a commutator and brushes, a main field-winding, an auxiliary field-winding in non-inductive relation to the armature-winding, and means for energizing said auxiliary winding when the motor is operating on a light load.

3. In an alternating-current motor, an armature-winding provided with a commutator and brushes, a main field-winding, an auxiliary field-winding in non-inductive relation to the armature winding, and means for connecting said auxiliary winding in series with said main winding when the motor is operating on a light load.

4. In an alternating-current motor, an armature provided with a commutator and brushes, a field structure approximately uniformly distributed around the armature and having portions recessed so as to be reduced in cross-section, a main field-winding distributed on said structure, an auxiliary winding placed in said recesses, and a switch for cutting said auxiliary winding into and out of circuit.

5. In an alternating-current motor, an armature provided with a commutator and brushes, a field structure approximately uniformly distributed around the armature and having portions recessed so as to be reduced in cross-section and adapted to be saturated on heavy loads, said recesses being located adjacent to the armature-coils short-circuited by the brushes, a main field-winding distributed on said structure, an auxiliary winding placed in said recesses, and a switch arranged to cut said auxiliary winding into and out of circuit.

6. In an alternating-current motor, an armature-winding provided with a commutator and brushes, a field-winding, and means for increasing the field strength relative to the armature-current on light loads.

In witness whereof I have hereunto set my hand this 24th day of September, 1904.

CHARLES P. STEINMETZ.

Witnesses:
BENJAMIN B. HULL,
HELEN ORFORD.